Oct. 25, 1955 T. A. RICH 2,721,977

VARIABLE AMPLITUDE OSCILLATOR

Filed May 9, 1951 2 Sheets-Sheet 1

Inventor
Theodore A. Rich
by Paul A. Frank
His Attorney

Inventor
Theodore A. Rich
by Paul A. Frank
His Attorney

United States Patent Office 2,721,977

Patented Oct. 25, 1955

2,721,977

VARIABLE AMPLITUDE OSCILLATOR

Theodore A. Rich, Schenectady, N. Y., assignor to General Electric Company, a corporation of New York Application May 9, 1951, Serial No. 225,433

15 Claims. (Cl. 324—99)

This invention relates to an improved electrical oscillator in which the amplitude of electric oscillations produced may be varied under control of a small electric signal. The oscillations may be rectified to give an amplified electric signal, thus providing an amplifier useful in electrical measuring instruments, in voltage regulators, and for other purposes.

An object of this invention is to provide a compact, inexpensive electrical amplifier having unusually high sensitivity, gain and stability, capable of amplifying either direct or alternating current and voltages.

An electron discharge device having an anode, a control electrode, and a cathode may produce electric oscillations when a regenerative feedback circuit is connected to feed back to the control electrode a portion of the anode electric potential variations in regenerative phase relation. The fraction thus fed back—i. e., the ratio of control electrode potential variations to anode potential variations—is known as the feedback ratio, and is determined by circuit parameters of the feedback circuit. With a very small feedback ratio, no oscillations are produced. With a large feedback ratio, the oscillations have a maximum amplitude determined by the characteristics of the discharge device, the operating voltages provided, and circuit losses. With intermediate values of feedback ratio, oscillations may be produced having an amplitude which is a function of the feedback ratio. According to the present invention, other electron discharge means, also having a control electrode, are connected in the oscillator feedback circuit to vary the feedback ratio, and thus the amplitude of oscillations produced, in accordance with variations in an electric potential applied to the control electrode of such other discharge means.

Figure 2:
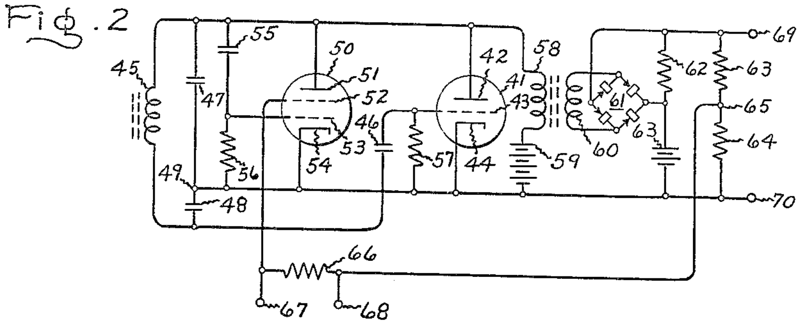
Figure 3:
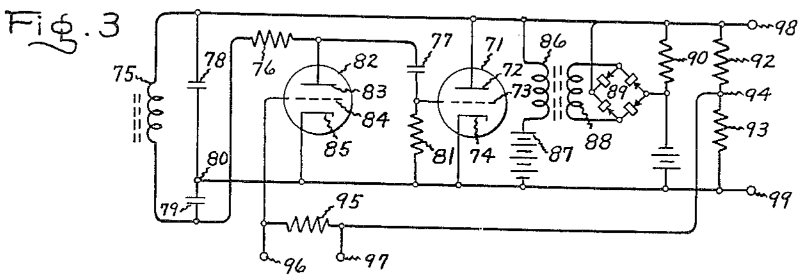
Figure 4:
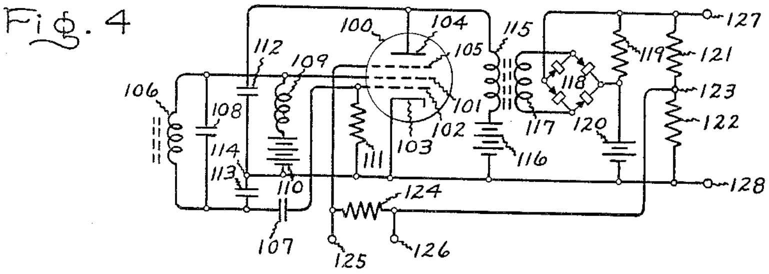
Figure 5:
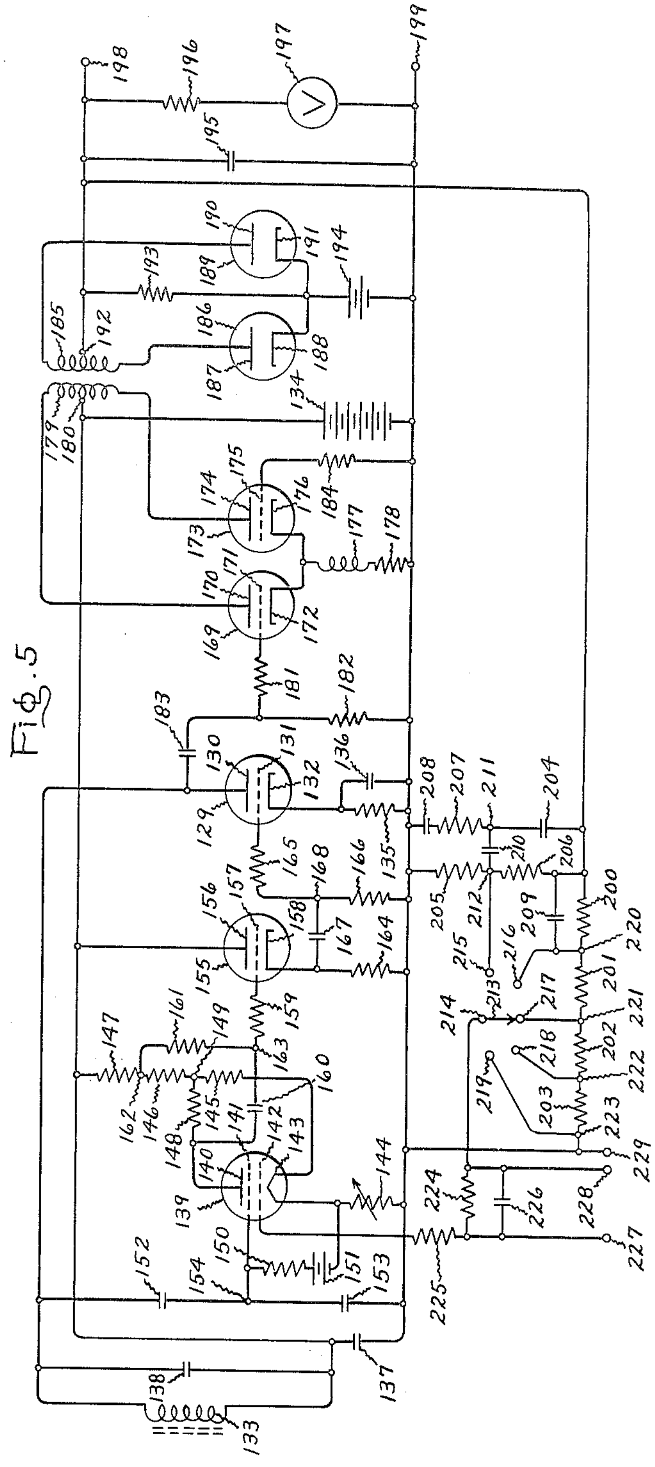
Figure 6:
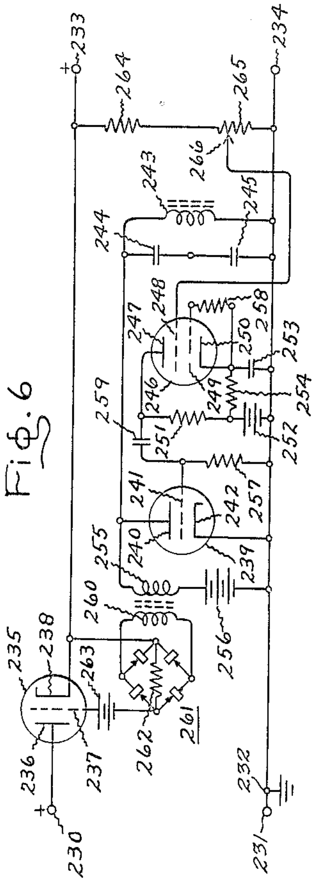

In the present invention, the features of my invention which are believed to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a schematic circuit diagram of an electrical amplifier embodying principles of this invention, Fig. 2 is a a schematic circuit diagram of another electrical amplifier embodying principles of the invention, Fig. 3 is a schematic circuit diagram of another electrical amplifier embodying principles of the invention, Fig. 4 is a schematic circuit diagram of still another electrical amplifier embodying principles of the invention, Fig. 5 is a circuit diagram of an improved voltage and current-measuring instrument, and Fig. 6 is a schematic circuit diagram of an improved voltage regulator.

Figure 1:
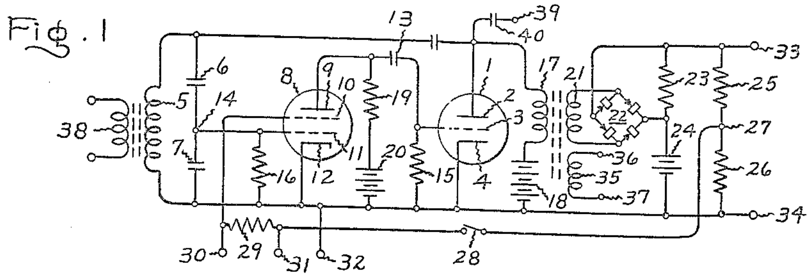

Referring now to Fig. 1 of the drawing, an electron discharge device 1 has an anode 2, a control electrode 3 and a cathode 4. Other electrodes may be present if desired. An inductor 5 is connected between anode 2 and cathode 4. Two capacitors, 6 and 7, are connected in series between anode 2 and cathode 4, as shown. Inductor 5 and capacitors 6 and 7 constitute a parallel resonant circuit, the resonant frequency of which chiefly determines the frequency of oscillations produced. Other electron discharge means are provided, such as electron discharge device 8 having an anode 9, two control electrodes 10 and 11, and a cathode 12. Anode 9 is connected through a capacitor 13 to control electrode 3, and cathode 12 is connected to cathode 4 as shown. Control electrode 11 is connected to the circuit junction 14 between capacitors 6 and 7. A grid-leak resistor 15 is connected between control electrode 3 and cathode 4, and a grid-leak resistor 16 is connected between control electrode 11 and cathode 12. Anode 2 is connected through an inductor 17 to the positive terminal of suitable voltage supply means, such as battery 18. Anode 9 is connected through load resistor 19 to the positive terminal of suitable voltage supply means, such as battery 20.

Capacitors 6 and 7 constitute a reactance voltage divider which transmits a portion of the electric potential variations from anode 2 to control electrode 11. Potential variations of opposite phase appear at anode 9, and these are transmitted by capacitor 13 to control electrode 3. Thus, a regenerative feedback circuit is provided which transmits a portion of the electric potential variations from anode 2 to control electrode 3 in regenerative phase relation, so that electric oscillations are produced. The feedback ratio is determined by the capacitance ratio of capacitors 6 and 7, and the gain of discharge device 8. Device 8 is designed so that its gain varies with variations in electric potential applied to control electrode 10, whereby the potential of electrode 10 controls the feedback ratio of the oscillator, and hence, the amplitude of the oscillations produced.

A winding 21, magnetically coupled to inductor 17, transmits the electric oscillations to a bridge-type rectifier 22, which provides across a resistor 23 a rectified voltage substantially proportional in value to the amplitude of electric oscillations produced by the oscillator. A battery 24, or other suitable voltage supply means, is connected in series with resistor 23. A resistance voltage divider, comprising resistors 25 and 26 in series, is connected across resistor 23 and battery 24 in series. This voltage divider has a tap 27 which is connected through a switch 28 and a resistor 29 in series to control electrode 10. An input terminal 30 is connected to control electrode 10, an input terminal 31 is connected to the other side of resistor 29, as shown, and an input terminal 32 is connected to cathode 12. Output terminals 33 and 34 are connected to respective ends of the resistance voltage divider.

Assume that switch 28 is open, and terminal 30 is connected to terminal 32 by an electrical short circuit. Control electrode 10 then has the same electric potential as cathode 12. Circuit values may be chosen such that oscillations of moderate amplitude are produced under these circumstances, and a rectified voltage is produced across resistor 23 which is proportional in value to the amplitude of these oscillations. Battery 24 preferably supplies a voltage which is exactly equal to this voltage across resistor 23, but is of opposite polarity, so that no net voltage is present between output terminals 33 and 34.

Assume, now, that the short circuit is removed, and a signal voltage is applied between input terminals 30 and 32. Assume that this signal voltage makes the electric potential of control electrode 10 positive with respect to that of cathode 12. This increases the gain of discharge device 8, and thus increases the feedback ratio of the oscillator to produce oscillations of larger amplitude. This, in turn, increases the rectified voltage across resistor 23, and produces a voltage between output terminals 33 and 34 which is substantially proportional to, but much larger than, the input signal voltage applied between terminals 30 and 32.

Conversely, if the input voltage is reversed in polarity, so that the electric potential of control electrode 10 is negative with respect to that of cathode 12, the gain of discharge device 8 is reduced, thereby reducing the feedback ratio of the oscillator and reducing the amplitude of the oscillations produced. This reduces the rectified voltage across resistor 23 to a value lower than the voltage provided by battery 24, so that a voltage again appears between output terminals 33 and 34, but of the opposite polarity.

Either direct or alternating voltages may be amplified in this manner. Despite the fact that the apparatus described is compact and inexpensive, comprising only two electron discharge devices when crystal rectifiers are employed in the rectifier bridge, high sensitivity and gain are obtainable. For example, signal voltages as small as 1 millivolt may be amplified by a factor of 500 or more.

For greater stability, with somewhat less gain, switch 28 may be closed and the input voltage signal applied between terminals 30 and 31. Now, the electric potential of control electrode 10 with respect to that of cathode 12 is determined by the difference between the two voltages across resistors 26 and 29, respectively. Assume that the input voltage would tend to make control electrode 10 more positive. This increases the feedback ratio of the amplifier, which produces larger oscillations and, hence, makes terminal 33 more negative. This produces a somewhat smaller negative potential at tap 27, which tends to make control electrode 10 less positive, and thus opposes the action of the input signal. Since the apparatus may be designed to provide large changes in oscillation amplitude in response to very small changes in the potential of electrode 10, in practice the changes in potential of electrode 10 are minute, and the apparatus operates to maintain substantial equality, with opposite polarities, between the respective voltages across resistors 26 and 29. Since the voltage across resistor 26 is a fixed fraction of the voltage between output terminals 33 and 34, and since this fraction is determined solely by the resistance ratio of resistor 26 to the total resistance of resistors 25 and 26 in series, the amplifier, when operated in this manner, has a highly stable gain, which is determined almost entirely by the circuit parameters of the resistance voltage divider.

Assuming that switch 28 is closed, the input signal may be an electric current instead of an electric voltage. For example, assume that an electric current is provided between input terminals 30 and 31. This current provides a voltage drop across resistor 29 which actuates the amplifier in exactly the same manner as an input voltage.

Alternatively, assume that an electric current is provided between input terminals 30 and 32. This current flows through resistors 26 and 29 in series. The output voltage between terminals 33 and 34 produces electric current through resistors 25 and 26 in series. These two currents produce respective voltage drops which act in opposition in their effect upon the potential of control electrode 10, so that the output voltage between terminals 33 and 34 is maintained at a value substantially proportional to the input current. Since the changes in potential of electrode 10 are minute, terminals 30 and 32 remain at substantially the same potential. Consequently, the impedance of the circuit to current between terminals 30 and 32 is exceptionally low.

Although an amplified voltage is available between terminals 33 and 34, an electrical output may be obtained from other portions of the circuit, if desired. For example, an additional winding 35 may be coupled magnetically to inductor 17. Winding 35 provides between its terminals 36 and 37 electric oscillations having a variable amplitude controlled by the input electric signal. Assume that the input signal is an alternating voltage. The oscillations obtained between terminals 36 and 37 have a frequency determined chiefly by the resonant frequency of the circuit comprising inductor 5 and capacitors 6 and 7, and have an amplitude which varies in correspondence with alternations in the input signal. These oscillations may be used as an amplitude-modulated carrier signal in an electric signalling system. Or, if desired, the oscillations between terminals 36 and 37 may be rectified by suitable rectifying means, not shown, to provide an amplified replica of the input signal. As further alternatives, output signals may be obtained from a winding 38 magnetically coupled to inductor 5, or from a terminal 39 coupled to anode 2 through a capacitor 40.

All of the gain necessary to produce oscillations may be provided by electron discharge device 1. Discharge device 8 may have a gain less than unity. This permits use of an electrometer type vacuum tube, such as Type 12BE6, for device 8, operated with a d.-c. anode potential of about 10 volts or less. This is desirable so that device 8 will have negligible grid current to its control electrodes. Resistor 29 may then have a very high resistance value, a million megohms, for example, to provide a high input impedance for minimum loading of the circuit supplying the input electric signal. Device 1 may be a Type 6SJ7 vacuum tube, for example.

The resonant frequency of the circuit comprising inductor 5 and capacitors 6 and 7, which chiefly determines the frequency of oscillations produced, is not critical, but should be substantially greater than the highest signal frequency to be amplified. An oscillation frequency of 50 kilocycles per second has been found satisfactory for many applications.

Fig. 2 illustrates an embodiment of the invention in which a reactance tube is used to vary the feedback ratio. In Fig. 2, an electron discharge device 41 has an anode 42, a control electrode 43 and a cathode 44. An inductor 45 is effectively connected between anode 42 and control electrode 43. A D.-C. blocking resistor 46 is connected between inductor 45 and control electrode 43 to prevent transmission of the direct component of anode potential to the control electrode. In parallel with inductor 45 are two capacitors, 47 and 48, in series, as shown, forming a parallel resonant circuit which chiefly determines the frequency of oscillations produced. Cathode 44 is connected to the circuit junction 49 between capacitors 47 and 48.

A second electron discharge device 50 has an anode 51, control electrodes 52 and 53, and a cathode 54. Anode 51 is connected to anode 42, and cathode 54 is connected to cathode 44, so that device 50 is effectively in parallel with capacitor 47. A capacitor 55 is connected between anode 51 and control electrode 53, and a resistor 56 is connected between control electrode 53 and cathode 54. A grid-leak resistor 57 is connected between control electrode 43 and cathode 44. Anodes 42 and 51 are connected through an inductor 58 to the positive terminal of suitable voltage supply means, such as battery 59.

The oscillations generated appear across the parallel resonant circuit comprising inductor 45 and capacitors 47 and 48. Since anode 42 is connected to one end of the resonant circuit, while control electrode 43 is connected to the other end of the resonant circuit, and cathode 44 is connected to an intermediate circuit junction, a portion of the electric potential variations are transmitted from anode 42 to control electrode 43 in regenerative phase relation, so that oscillations are produced. The feedback ratio is determined by a reactance voltage divider comprising capacitors 47 and 48 and the electron discharge device 50. Capacitor 55 and resistor 56 constitute a phase-shifting network which transmits to control electrode 53 a voltage substantially 90 degrees out-of-phase with the voltage between anode 51 and cathode 54.

Therefore, the current through device 50 is 90 degrees out-of-phase with the voltage between its anode and cathode, so that device 50 acts as a capacitive reactance in the circuit. The amount of current conducted by device 50, and hence, the amount of reactance which it presents to the circuit, is controlled by the electric potential of control electrode 52. This variable capacitive reactance is in parallel with capacitor 47, so that the electric potential of control electrode 52 controls the capacitance ratio of the reactance voltage divider, and hence controls the feedback ratio of the oscillator.

A winding 60, magnetically coupled to inductor 58, transmits the oscillations to a bridge-type rectifier 61, which is connected to provide across a resistor 62 a rectified voltage having a value substantially proportional to the amplitude of the oscillations produced. A battery 63, or other suitable voltage supply means, is connected in series with resistor 62 with such polarity that its voltage opposes the voltage drop across the resistor. A resistance voltage divider, comprising resistors 63 and 64 in series, is connected across resistor 62 and battery 63 in series. A tap 65 of this voltage divider is connected through a resistor 66 to control electrode 52. Input terminals 67 and 68 are connected to respective ends of resistor 66, and output terminals 69 and 70 are connected to opposite ends of the voltage divider comprising resistors 63 and 64, as shown.

Assume that the voltage between input terminals 67 and 68 is zero, and that the electric potential of control electrode 52 is the same as the potential of cathode 54. The circuit may be adjusted so that oscillations of moderate amplitude are produced under these conditions, thereby producing across resistor 62 a rectified voltage exactly equal to the opposing voltage across battery 63. Accordingly, the voltage between output terminals 69 and 70 is also zero.

Assume, now, that an input signal is applied between terminals 67 and 68 such that terminal 67 is at a positive electric potential with respect to terminal 68. The electric potential of control electrode 52 is then positive with respect to the potential of cathode 54, and the conduction of current by device 50 is increased. This reduces the reactance of device 50, and thus increases the feedback ratio of the regenerative feedback circuit, so that larger oscillations are produced. This produces a larger voltage across resistor 62, so that output terminal 69 acquires a negative electric potential with respect to output terminal 70. A fraction of this negative potential appears at tap 65, which tends to make control electrode 52 less positive, and thus limits the amplitude of the oscillations. In practice, the potential of control electrode 52 may change by only minute amounts, to produce across resistor 64 a voltage which substantially equals and opposes any input voltage applied between terminals 67 and 68. Since the voltage across resistor 64 is a fixed fraction of the output voltage between terminals 69 and 70, which fraction is determined solely by the resistance ratio of resistor 64 to the sum of the resistances of resistors 63 and 64, an amplifier having high sensitivity and a very stable gain is provided for the amplification of either direct or alternating electric signals.

Fig. 3 illustrates another embodiment of the invention. As shown in this figure, an electron discharge device 71 has an anode 72, a control electrode 73, and a cathode 74. An inductor 75 is connected in series with a resistor 76 and a D.-C. blocking capacitor 77 between anode 72 and control electrode 73. Capacitors 78 and 79 are connected in series across inductor 75, as shown. Cathode 74 is connected to the circuit junction 80 between capacitors 78 and 79. A grid-leak resistor 81 is connected between control electrode 73 and cathode 74.

Another electron discharge device 82 has an anode 83, a control electrode 84, and a cathode 85. Anode 83 is connected to the circuit junction between resistor 76 and capacitor 77, and cathode 85 is connected to cathode 74. Device 82 presents to the circuit a variable resistance the value of which is determined by the electric potential of control electrode 84. Anode 72 is connected through an inductor 86 to the positive terminal of suitable voltage supply means, such as a battery 87.

Oscillations produced appear across the parallel resonant circuit comprising inductor 75 and capacitors 78 and 79. Since anode 72 and control electrode 73 are effectively connected to opposite ends of this resonant circuit, while cathode 74 is connected to an intermediate circuit junction, a portion of the anode electric potential variations are transmitted to the control electrode of device 71 in regenerative phase relation. Capacitors 78 and 79, resistor 76 and discharge device 82 constitute a voltage divider which determines the feedback ratio, and, hence, the amplitude of oscillations produced.

As control electrode 84 is made more positive, more current is conducted by device 82, thus reducing its effective resistance. This reduces the feedback ratio of the regenerative feedback circuit, and decreases the amplitude of oscillations generated. Conversely, as control electrode 84 becomes more negative, device 82 conducts less current, so that its effective resistance becomes greater. This increases the feedback ratio, and increases the amplitude of the oscillations.

A winding 88, magnetically coupled to inductor 86, transmits oscillations to a bridge-type rectifier 89, which provides across a resistor 90 a rectified voltage having a value substantially proportional to the amplitude of the oscillations. A battery 91, or other suitable voltage supply means, is connected in series with resistor 90, with its polarity such that the battery voltage opposes the voltage drop across resistor 90. A resistance voltage divider, comprising resistors 92 and 93 in series, is connected across resistor 90 and battery 91 in series. A tap 94 of this voltage divider is connected through a resistor 95 to control electrode 84. Input terminals 96 and 97 are respectively connected to opposite ends of resistor 95, and output terminals 98 and 99 are respectively connected to opposite ends of the resistance voltage divider comprising resistors 92 and 93.

Assume that the voltage between terminals 96 and 97 is zero, and that control electrode 84 is at the same electric potential as cathode 85. The circuit may be adjusted so that moderate oscillations are produced under these conditions, and a rectified voltage appears across resistor 90 which is opposed by, and exactly equal to, the voltage across battery 91. Then the voltage between output terminals 98 and 99 is also zero.

Assume now that an input electric signal is applied between terminals 96 and 97 such that terminal 96 is positive with respect to terminal 97. Control electrode 84 is then positive with respect to cathode 85, and the conduction of current by device 82 is increased. This decreases the effective resistance of device 82, decreases the feedback ratio of the oscillator, and correspondingly reduces the amplitude of oscillations produced. This, in turn, reduces the voltage drop across resistor 90 to a value less than the voltage provided by battery 91, so that terminal 98 becomes negative with respect to terminal 99. A fraction of this negative potential is transmitted to circuit junction 94 by the voltage divider comprising resistors 92 and 93. This makes control electrode 84 less positive, and thus limits the increase in amplitude of the oscillations. In actual practice, the changes in potential of control electrode 84 are minute, and any voltage applied between input terminals 96 and 97 is substantially balanced by an opposing voltage drop across resistor 93. Since the voltage across resistor 93 is a predetermined fraction of the voltage between output terminals 98 and 99, which fraction is determined solely by the resistance ratio of the voltage divider comprising resistors 92 and 93, an amplifier having highly stable gain characteristics is provided.

Fig. 4 is a schematic circuit diagram illustrating an embodiment of the invention in which both electron discharge means are incorporated in a single vacuum tube envelope 100. A portion of this envelope contains an electron discharge device comprising a first anode 101, a first control electrode 102, and a cathode 103. Electron-coupled to this device is other electron discharge means comprising a second anode 104 and a control electrode 105. Connected between anode 101 and control electrode 102 is an inductor 106 in series with a D.-C. blocking capacitor 107. A capacitor 108 is connected in parallel with inductor 106 to form a parallel resonant circuit which chiefly determines the frequency of oscillations generated. Anode 101 is connected through an inductor 109 to the positive terminal of suitable voltage supply means, such as battery 110. A grid-leak resistor 111 is connected between control electrode 102 and cathode 103. A reactive voltage divider, comprising capacitors 112 and 113 in series, is connected between the second anode 104 and control electrode 102. Cathode 103 is connected to the circuit junction 114 between capacitors 112 and 113. Anode 104 is connected through an inductor 115 to the positive terminal of suitable voltage supply means, such as battery 116.

Electric potential variations are transmitted from first anode 101 to second anode 104 by electron coupling. A fraction of these potential variations are transmitted to control electrode 102 in regenerative phase relation by the voltage divider comprising capacitors 112 and 113, so that electric oscillations are produced. The transmission of oscillations from anode 101 to anode 104 is controlled by the electric potential of control electrode 105. As control electrode 105 is made more positive, a larger proportion of the oscillations are transmitted from anode 101 to anode 104, and, hence, to control electrode 102. Conversely, as control electrode 105 is made more negative, a smaller proportion of the oscillations are transmitted to anode 104, and thence to control electrode 102. Thus, the electric potential of control electrode 105 controls the feedback ratio of the oscillator, and thereby controls the amplitude of oscillations generated.

A winding 117, magnetically coupled to inductor 115, transmits oscillations to a bridge-type rectifier 118, which provides across a resistor 119 a rectified voltage having a value substantially proportional to the amplitude of oscillations generated. A battery 120, or other suitable voltage supply means, is connected in series with resistor 119, with its polarity such that the battery voltage opposes the rectified voltage across resistor 119. A resistance voltage divider, comprising resistors 121 and 122 in series, is connected in parallel with resistor 119 and battery 120 in series, as shown. A tap 123 of this voltage divider is connected through a resistor 124 to control electrode 105. Input terminals 125 and 126 are connected to respective ends of resistor 124, and output terminals 127 and 128 are connected to respective ends of the voltage divider comprising resistors 121 and 122.

Assume that the voltage between terminals 125 and 126 is zero, and that control electrode 105 has the same electric potential as cathode 103. The circuit may be adjusted so that oscillations of moderate amplitude are generated under these conditions, and a rectified voltage is provided across resistor 119 which is exactly equal to, and opposed by, the voltage of battery 120. Then there is no voltage between output terminals 127 and 128.

Now, assume that an input voltage is applied between terminals 125 and 126 such that control electrode 105 is positive with respect to cathode 103. A larger proportion of the oscillations are transmitted from first anode 101 to second anode 104, which increases the feedback ratio of the oscillator and thereby increases the amplitude of oscillations generated. The voltage drop across resistor 109 now is larger than the voltage of battery 120, so that output terminal 127 is negative with respect to output terminal 128. A portion of the negative potential of terminal 127 is transmitted to tap 123 by the resistance voltage divider. This makes control electrode 105 less positive, and thus limits the amplitude of oscillations generated.

In actual practice, the changes in potential of control electrode 105 are minute, and the amplitude of oscillations is controlled so that the voltage across resistor 122 is always substantially equal to the input voltage applied between terminals 125 and 126. Since the voltage between output terminals 127 and 128 is a fixed multiple of the voltage across resistor 122, determined by the circuit parameters of the resistance voltage divider comprising resistors 121 and 122, an amplifier of highly stable gain characteristics is provided.

Fig. 5 is a circuit diagram which illustrates a preferred embodiment of the invention especially adapted for the measurement of small voltages and currents. An electron discharge device 129 has an anode 130, a control electrode 131, and a cathode 132. An inductor 133 is connected between anode 130 and the positive terminal of suitable voltage supply means, such as battery 134. Cathode 132 is connected through a cathode resistor 135 to the negative terminal of battery 134. Bypass capacitor 136 is connected in parallel with resistor 135. Inductor 133 is also connected to the negative terminal of battery 134 through D.-C. blocking capacitor 137. A capacitor 138 is connected in parallel with inductor 133 to form a parallel resonant circuit which chiefly determines the frequency of oscillations produced. This parallel resonant circuit is effectively connected between anode 130 and cathode 132 by capacitors 136 and 137.

A second electron discharge device 139 has an anode 140, control electrodes 141 and 142, and a cathode filament 143. One end of filament 143 is connected to the negative terminal of battery 134 through a variable cathode resistor 144. The other end of filament 143 is connected to the positive terminal of battery 134 through a voltage divider comprising resistors 145, 146 and 147 in series. Anode 140 is connected through a load resistor 148 to the circuit junction 149 between resistors 145 and 146, as shown. Control electrode 141 is connected to cathode filament 143 through a grid-leak resistor 150 and suitable bias voltage supply means, such as battery 151. A reactive voltage divider, comprising capacitors 152 and 153 in series, is connected between anode 130 and the negative terminal of battery 134. Control electrode 141 is connected to the circuit junction 154 between capacitors 152 and 153.

A third electron discharge device 155 has an anode 156, a control electrode 157, and a cathode 158. Anode 156 is connected to the positive terminal of battery 134. Control electrode 157 is connected, through a current-limiting resistor 159 and a coupling capacitor 160 in series, to anode 140. A resistor 161 is connected from the circuit junction 162 between resistors 146 and 147 to the circuit junction 163 between resistor 159 and capacitor 160. Cathode 158 is connected through cathode resistor 164 to the negative terminal of battery 134. Control electrode 131 is connected to the negative terminal of battery 134 through grid-leak resistors 165 and 166 in series. A coupling capacitor 167 is connected between cathode 158 and the circuit junction 168 between resistors 165 and 166.

A portion of the electric potential variations are transmitted from anode 130 to control electrode 141 by the voltage divider comprising capacitors 152 and 153. These variations are reversed in phase at anode 140, and are transmitted through capacitor 160 and resistor 159 to control electrode 157. The variations are then transmitted from cathode 158 through capacitor 167 and resistor 165 to control electrode 131. Thus, a portion of the electric potential variations are transmitted from anode 130 to control electrode 131 in regenerative phase relation, so that electric oscillations are produced. The electric potential of control electrode 142 controls the gain of device 139, and thus controls the feedback ratio of the oscillator and the amplitude of oscillations generated. Device 155 is a cathode follower, the chief purpose of which is to prevent loading of device 139 by grid current from the oscillator tube 129.

One important feature of the present circuit resides in the connections of filament 143 whereby the effects of supply voltage variations are compensated. Assume that the voltage provided by battery 134 increases by a small amount. This increases the current through filament 143, and thus increases the emission of electrons by the filament. It also increases the D.-C. potential of anode 140. Both of these effects tend to increase the gain of device 139. However, the increased voltage and the increased filament emission both tend to increase the voltage drop across resistor 144, which raises the D.-C. potential of cathode filament 143. This tends to reduce the gain of device 139. By proper adjustment of the value of resistor 144, these effects can be made to substantially compensate, so that reasonable changes in the voltage provided by battery 134, or other voltage supply means employed, have little effect upon the amplitude of oscillations produced.

Another electron discharge device 169 has an anode 170, a control electrode 171 and a cathode 172. Still another electron discharge device 173 has an anode 174, a control electrode 175, and a cathode 176. Cathodes 172 and 176 are connected together, and are connected to the negative terminal of battery 134 through an inductor 177 and a cathode resistor 178 in series, as shown. Anodes 170 and 174 are connected to opposite ends of a transformer primary winding 179. Winding 179 has a center tap 180 connected to the positive terminal of battery 134. Control electrode 171 is connected to the negative terminal of battery 134 through grid-leak resistors 181 and 182 in series. A coupling capacitor 183 is connected from anode 130 to the circuit junction between resistors 181 and 182. Control electrodes 175 is connected to the negative terminal of battery 134 through a grid-leak resistor 184. If desired, electron discharge devices 169 and 173 may be included within a single envelope.

Oscillations are transmitted from anode 130 through capacitor 183 and resistor 181 to control electrode 171. These oscillations cause variations in the current conducted by device 169, which produces an alternating voltage drop across inductor 177 and resistor 178, which transmits the oscillations to cathode 176. This causes variations of opposite phase in the current conducted by device 173, thus providing "push-pull" energization of transformer primary winding 179.

A transformer secondary winding 185 is magnetically coupled to winding 179. A diode rectifier 186 has an anode 187 and a cathode 188. A second diode rectifier 189 has an anode 190 and a cathode 191. Anodes 187 and 190 are respectively connected to opposite ends of winding 185. A center tap 192 of winding 185 is connected through a resistor 193 to the two cathodes 188 and 191, as shown. This forms a full-wave rectifier circuit which provides, across resistor 193, a rectified voltage substantially proportional in value to the amplitude of oscillations produced by the oscillator. A battery 194, or other suitable voltage supply means, is connected in series with resistor 193, as shown, with its polarity such that the battery voltage opposes the voltage across resistor 193. This is achieved by connecting the positive terminal of battery 194 to cathodes 188 and 191. A capacitor 195 is connected between tap 192 and the negative terminal of battery 194. Voltage measuring means, comprising a resistor 196 in series with a voltmeter 197, is connected across capacitor 195. Output terminals 198 and 199 may also be connected to opposite sides of capacitor 195, as shown.

A phase-compensated voltage divider and feedback network is also connected across capacitor 195. This network comprises resistors 200, 201, 202 and 203 connected in series across capacitor 195, a capacitor 204 and a resistor 205 connected in series across capacitor 195, and a resistor 206, a resistor 207 and a capacitor 208 connected in series across capacitor 195, as shown. A capacitor 209 is connected in parallel with resistor 200. A capacitor 210 is connected from the circuit junction 211 between capacitor 204 and resistor 205 to the circuit junction 212 between resistors 206 and 207.

A five-position switch 213 has a terminal 214 which is selectively connected to terminals 215, 216, 217, 218 or 219. Terminal 215 is connected to circuit junction 212. Terminal 216 is connected to the circuit junction 220 between resistors 200 and 201. Terminal 217 is connected to the circuit junction 221 between resistors 201 and 202. Terminal 218 is connected to the circuit junction 222 between resistors 202 and 203. Terminal 219 is connected to the circuit junction 223 between resistor 203 and capacitor 195. Terminal 214 is connected to control electrode 142 through resistors 224 and 225 in series. A small capacitor 226 may be connected in parallel with resistor 224. Input terminals 227 and 228 are respectively connected to opposite ends of resistor 224. Input terminal 229 is connected to the negative terminal of battery 134.

Assume that no electric signal is applied to the input terminals, and that control electrode 142 is at the same electric potential as the negative terminal of battery 134. Preferably the circuit is adjusted so that oscillations of moderate amplitude are produced under these conditions, which provides a rectified voltage across resistor 193 which is exactly equal to, and opposed by, the voltage across battery 194. No output voltage is present across capacitor 195, and voltmeter 197 provides a zero indication. Assume now that an input voltage is applied between terminals 227 and 228, such that control electrode 142 has a positive potential with respect to the negative terminal of battery 134. This increases the gain of device 139, thus increasing the feedback ratio of the oscillator and increasing the amplitude of oscillations produced. The rectified voltage across resistor 193 is now larger than the voltage across battery 194, and output terminal 198 is at a negative electric potential with respect to output terminal 199. The value of this negative potential is indicated by voltmeter 197. A portion of the negative potential at terminal 198 is transmitted to terminal 214 by the voltage divider and feedback network. This tends to make control electrode 142 less positive, and thus limit the amplitude of oscillations produced.

In practice, the potential changes of control electrode 142 are minute, so that any voltage applied between terminals 227 and 228 is substantially balanced by the potential difference between terminal 214 and the negative terminal of battery 134. The output voltage between terminals 198 and 199 is a fixed multiple of this potential difference, determined by the fraction of the output voltage transmitted to terminal 214 by the voltage divider and feedback network. This fraction may be selectively adjusted to any one of several values by changing the position of switch 214. For example, the voltage divider and feedback circuit may be designed so that one position of switch 213 feeds back to terminal 214 one-tenth of the output voltage, and thus provides an output voltage ten times as large as the input signal. Another position of switch 213 may feed back to terminal 214 one-hundredth of the output voltage, and thus provide an output voltage one hundred times as large as the input signal. Thus, switch 213 operates as a range-changing switch, by means of which a wide range of input voltages may be measured. The measured value of the input signal is determined simply by reading the indication of voltmeter 197, and multiplying this value by a multiplying factor determined from the position of switch 213. The voltage obtainable between output terminals 198 and 199 may be used to operate other voltage indicating apparatus, or for any other purpose desired.

When the input signal to be measured is an electric current, it is usually preferable to apply this signal between input terminals 227 and 229. The operation of the apparatus is substantially the same as when a voltage is measured, except that the input current produces a voltage drop across resistor 224, and also modifies the voltage drop across a part of the resistance voltage divider. For example, suppose that switch 213 is in the position indicated in the drawing, so that terminal 214 is connected to terminal 217. An input current applied between terminals 227 and 229 flows through resistors 224, 202, and 203. Preferably, the resistance of resistor 224 is many times that of resistors 202 and 203 in series, so that the current produces a relatively large voltage drop across resistor 224, and produces but slight modification of the voltage drops across resistors 202 and 203. The resulting changes in potential of control electrode 142 control the amplitude of oscillations produced to provide between the output terminals a voltage which supplies across resistors 202 and 203 a voltage drop substantially equal to the voltage drop across resistor 224. Thus, the output voltage, which may be measured by voltmeter 197, is accurately related to the value of the input current. However, since the changes in potential of control electrode 142 are minute, the electric potential of input terminal 227 remains substantially equal to the potential of terminal 229. Consequently, the circuit has a very low impedance with respect to the input current, which is very desirable in measuring small currents since a high-impedance measuring circuit could substantially change the value of the current to be measured. With an amplifier as described gains of 400,000 have been obtained with an output of 200 volts at 2 milliamperes and an input grid current of $10^{-15}$ amperes.

Fig. 6 is a schematic circuit diagram illustrating an improved voltage regulator embodying principles of the invention. An important advantage of this regulator is that the voltage of a high-potential electric transmission line can be regulated by apparatus, the major portion of which is at relatively low potential. Referring now to Fig. 6, voltage is supplied to input terminals 230 and 231 by any suitable means, not shown. Terminal 230 may be the positive terminal, and terminal 231 may be connected to ground, as indicated at 232. A regulated voltage is obtained between output terminals 233 and 234 by controlling the voltage drop across an electron discharge device 235 connected in series between the input and output terminals, as shown. Device 235 has an anode 236, a control electrode 237 and a cathode 238. Anode 236 is connected to input terminal 230, and cathode 238 is connected to output terminal 233. The conduction of current by device 235, and, hence, the voltage drop across the device, is controlled, as hereinafter more fully explained, by the electric potential of control electrode 237.

Another electron discharge device 239 has an anode 240, a control electrode 241 and a cathode 242. An inductor 243 is connected between anode 240 and cathode 242. Two capacitors 244 and 245 in series are also connected between anode 240 and cathode 242. Inductor 243 and capacitors 244 and 245 form a parallel resonant circuit which determines the frequency of oscillations generated.

Still another electron discharge device 246 has an anode 247, control electrodes 248 and 249, and a cathode 250. Anode 247 is connected through a load resistor 251 to the positive terminal of suitable voltage supply means, such as battery 252. Cathode 250 is connected to the negative terminal of battery 252 through a voltage regulator tube 253, which may be a neon glow tube having the characteristic of providing a substantially constant voltage across its terminals over a considerable range of current values. A resistor 254 may be connected between cathode 250 and the positive terminal of battery 252.

Anode 240 is connected through an inductor 255 to the positive terminal of suitable voltage supply means, such as battery 256. Cathode 242 is connected to the negative terminal of battery 256. A grid-leak resistor 257 is connected between control electrode 241 and cathode 242, and a grid-leak resistor 258 is connected between control electrode 249 and cathode 250. A coupling capacitor 259 is connected between anode 247 and control electrode 241.

Capacitors 244 and 245 constitute a reactance voltage divider which transmits a portion of the electric potential variations from anode 240 to control electrode 249. These potential variations are inverted in phase at anode 247, and are transmitted by capacitor 259 to control electrode 241. Thus, a portion of the electric potential variations are transmitted from anode 240 to control electrode 241 in regenerative phase relation, so that electric oscillations are produced. The electric potential of control electrode 248 controls the gain of device 246, and thus controls the feedback ratio of the oscillator and the amplitude of the oscillations generated.

A winding 260, magnetically coupled to inductor 255, transmits oscillations to a bridge-type rectifier 261, which provides across a resistor 262 a rectified voltage proportional in value to the amplitude of the oscillations generated. Resistor 262 is connected in series with a battery 263, or other bias voltage supply means, between cathode 238 and control electrode 237. A voltage divider comprising resistors 264 and 265 in series, is connected between output terminals 233 and 234. An adjustable tap 266 on resistor 265 is connected to control electrode 248.

Assume that the voltage between output terminals 233 and 234 is such that control electrode 248 is at substantially the same electric potential as cathode 250. The circuit may be adjusted to provide oscillations of moderate amplitude under these conditions, which provides a rectified voltage of moderate value across resistor 262, and permits moderate conduction of current by discharge device 235. Assume, now, that the voltage between terminals 233 and 234 increases. This increases the electric potential of control electrode 248, and thus increases the gain of discharge device 246. This effectively increases the feed back ratio of the oscillator, and therefore increases the feedback ratio of the oscillator, and therefore increases the amplitude of oscillations generated. In consequence, a larger rectified voltage is produced across resistor 262. This makes control electrode 237 more negative with respect to cathode 238, and thus reduces the conduction of current by device 235, thereby increasing the voltage drop across device 235 and decreasing the voltage between output terminals 233 and 234.

Conversely, if the voltage between terminals 233 and 234 decreases below the initial value, the potential of control electrode 238 is reduced, the amplitude of oscillations is reduced, and control electrode 237 is made less negative with respect to cathode 238. This increases the conduction of current by device 235, thereby reducing the voltage drop across device 235 and increasing the voltage between output terminals 233 and 234. In this manner the voltage between the output terminals is closely regulated, and may be adjusted in value as desired by changing the position of tap 266.

Having described the principles of this invention and the best modes in which I contemplate applying those principles, I wish it to be understood that the examples described are illustrative only, and that other means may be employed without departing from the true scope of the invention.

What I claim as new and desire to secure by Letters Patent of the United States is:

1. In combination, an electrical oscillator having a regenerative feedback circuit for producing electric oscillations, electron discharge means connected in said feedback circuit for controlling the feedback ratio, said discharge means having a control electrode the electric potential of which controls the conduction of electric current by said discharge means, and thus controls the feedback ratio of the oscillator and the amplitude of the oscillations produced, a voltage divider, rectifying means connected to provide across said voltage divider voltage proportional in value to the amplitude of said oscillations, and electrical input terminals connected in series with said control electrode and a portion of said voltage divider, whereby an electric signal applied to said input terminals controls the amplitude of said oscillations to produce across said voltage divider a voltage proportional in value to said electric signal.

2. An electrical amplifier comprising an electron discharge device having an anode, a control electrode and a cathode, a regenerative feedback circuit connected to feedback to said control electrode a portion of the anode electric potential variations in regenerative phase relation, whereby electric oscillations are produced, said feedback circuit including other electron discharge means connected to control the feedback ratio, said other electron discharge means having a control electrode the electric potential of which controls the amplitude of oscillations produced, a voltage divider, rectifying means connected to provide across said voltage divider a voltage proportional in value to the amplitude of said oscillations, and electrical input terminals connected in series with said control electrode and a portion of said voltage divider, whereby an electric signal applied to said input terminals controls the amplitude of said oscillations to produce across said voltage divider a voltage proportional in value to said electric signal.

3. An electrical amplifier comprising a first electron discharge device having an anode, a control electrode and a cathode, a regenerative feedback circuit connected to feedback to said control electrode a portion of the anode electric potential variations in regenerative phase relation, whereby electric oscillations are produced, said feedback circuit including a first voltage divider which determines the feedback ratio of the oscillator and thus determines the amplitude of the oscillations produced, a second electron discharge device connected in parallel with a portion of said first voltage divider for controlling said feedback ratio, said second discharge device having a control electrode the electric potential of which controls the conduction of electric current by said second discharge device, and thus controls the amplitude of the oscillations produced, a second voltage divider, rectifying means connected to provide across said second voltage divider a voltage proportional in value to the amplitude of said oscillations, and electrical input terminals connected in series with said control electrode and a portion of said second voltage divider, whereby an electric signal applied to said input terminals controls the amplitude of said oscillations to produce across said voltage divider a voltage proportional in value to said input signal.

4. An electrical oscillator comprising a first electron discharge device having an anode, a cathode and a control electrode, a second electron discharge device having an anode, first and second control electrodes, and a cathode, circuit means for transmitting electric potential variations from the anode of said first discharge device to the first control electrode of said second discharge device, and circuit means for transmitting electric potential variations from the anode of said second discharge device to the control electrode of said first discharge device, thereby providing regenerative feedback to produce electric oscillations, and connections for controlling the potential of the second control electrode of said second discharge device to control the amplitude of said oscillations.

5. An electrical oscillator comprising a first electron discharge device having an anode, a control electrode and a cathode, an inductor connected between the anode and the cathode of said first discharge device, two capacitors connected in series between the anode and the cathode of said first discharge device, and a second electron discharge device having an anode, first and second control electrodes, and a cathode, circuit means for transmitting electric potential variations from the circuit junction between said two capacitor to the first control electrode of said second discharge device, and circuit means for transmitting electric potential variations from the anode of said second discharge device to the control electrode of said first discharge device, whereby said capacitors and said second discharge device provide a regenerative feedback circuit to feed back in regenerative phase relation electric potential variations from the anode to the control electrode of said first discharge device, thereby producing electric oscillations, the electric potential of said second control electrode controlling the conduction of electric current by said second discharge device, and thus controlling the feedback ratio of the oscillator and the amplitude of said oscillations.

6. An electrical amplifier comprising a first electron discharge device having an anode, a control electrode and a cathode, an inductor connected between the anode and the cathode of said first discharge device, two capacitors connected in series between the anode and the cathode of said first discharge device, a second electron discharge device having an anode, first and second control electrodes, and a cathode, circuit means for transmitting electric potential variations from the circuit junction between said two capacitors to the first control electrode of said second discharge device, circuit means for transmitting electric potential variations from the anode of said second discharge device to the control electrode of said first discharge device, whereby said capacitors and said second discharge device provide a regenerative feedback circuit to feed back in regenerative phase relation eelctric potential variations from the anode to the control electrode of said first discharge device, thereby producing electric oscillations, the electric potential of said second control electrode controlling the conduction of electric current by said second discharge device, and thus controlling the feedback ratio of the oscillator and the amplitude of said oscillations, a resistance voltage divider, rectifying means connected to provide across said resistance voltage divider a voltage proportional in value to the amplitude of said oscillations, and input terminals connected in series with said second control electrode and a portion of said resistance voltage divider, whereby an electric signal applied to said input terminals controls the amplitude of said oscillations to produce across said voltage divider a voltage proportional in value to said electric signal.

7. An electrical oscillator comprising a first electron discharge device having an anode, a control electrode, and a cathode, a second electron discharge device having an anode, first and second control electrodes, and a cathode, a third electron discharge device having an anode, a control electrode, and a cathode, circuit means for transmitting electric potential variations from the anode of said first discharge device to the first control electrode of said second discharge device, circuit means for transmitting electric potential variations from the anode of said second discharge device to the control electrode of said third discharge device, and circuit means for transmitting electric potential variations from the cathode of said third discharge device to the control electrode of said first discharge device, thus providing a regenerative feedback circuit whereby electric oscillations are produced, the electric potential of said second control electrode controlling the electric current conducted by said second discharge device and thus controlling the feedback ratio of said feedback circuit to control the amplitude of said oscillations.

8. An electrical oscillator comprising a first electron discharge device having an anode, a control electrode and a cathode, a second electron discharge device having an anode, first and second control electrodes, and a cathode filament, a cathode resistor and a tapped resistance voltage divider connected in series with said filament and to opposite ends thereof, means to apply voltage across said voltage divider, filament, and cathode resistor in series, a resistor connected between a tap of said voltage divider and the anode of said second discharge device, circuit means for transmitting electric potential variations from the anode of said first discharge device to the first control electrode of said second discharge device, and circuit means for transmitting electric potential variations from the anode of said second discharge device to the control electrode of said first discharge device, thus providing a regenerative feedback circuit whereby electric oscillations are produced, the electric potential of said second control electrode controlling the electric current conducted by said second discharge device and thus controlling the feedback ratio of said feedback circuit to control the amplitude of said oscillations.

9. An electrical oscillator comprising a first electron discharge device having an anode, a control electrode, and a cathode, a second electron discharge device having an anode, first and second control electrodes, and a cathode filament, a third electron discharge device having an anode, a cathode, and a control electrode, voltage supply means having positive and negative terminals, circuit means connecting the anode of said first discharge device to a positive terminal of said voltage supply means, circuit means connecting the cathode of said first discharge device to a negative terminal of said voltage supply means, a tapped resistance voltage divider connected between a positive terminal of said voltage supply means and one end of said filament, a cathode resistor connected between the other end of said filament and a negative terminal of said voltage supply means, a resistor connected between a tap of said resistance voltage divider and the anode of said second discharge device, circuit means connecting the anode of said third discharge device to a positive terminal of said voltage supply means, a cathode resistor connected between the cathode of said third discharge device and a negative terminal of said voltage supply means, a parallel resonant circuit effectively connected between the anode and cathode of said first discharge device, two capacitors in series effectively connected in parallel with said resonant circuit, circuit means connecting the circuit junction of said two capacitors to the first control electrode of said second discharge device, whereby electric potential variations are transmitted from the anode of said first discharge device to the first control electrode of said second discharge device, circuit means for transmitting electric potential variations from the anode of said second discharge device to the control electrode of said third discharge device, and circuit means for transmitting electric potential variations from the cathode of said third discharge device to the control electrode of said first discharge device, thus providing a regenerative feedback circuit whereby electric oscillations are produced, the electric potential of said second control electrode controlling the electric current conducted by said second discharge device and thus controlling the feedback ratio of said feedback circuit to control the amplitude of said oscillations.

10. Electrical measuring apparatus comprising an electrical oscillator having a regenerative feedback circuit for producing electric oscillations, electron discharge means connected in said feedback circuit for controlling the feedback ratio, said discharge means having a control electrode the electric potential of which controls the conduction of electric current by said discharge means, and thus controls the feedback ratio of the oscillator and the amplitude of the oscillations produced, a voltage divider, rectifying means connected to provide across said voltage divider voltage proportional in value to the amplitude of said oscillations, electric input terminals connected in series with said control electrode and a portion of said voltage divider, whereby an electric signal applied to said input terminals controls the amplitude of said oscillations to produce across said voltage divider a voltage proportional in value to said electric signal, and a voltage measuring device connected across said voltage divider.

11. An electrical oscillator comprising a first electron discharge device having an anode, a control electrode, and a cathode, an inductor effectively connected between the anode and the control electrode of said first discharge device, a first capacitor effectively connected between the anode and cathode of said first discharge device, a second capacitor effectively connected between the control electrode and the cathode of said first discharge device, thus forming a regenerative feedback circuit for producing electric oscillations in which said first and second capacitors are comprised in a voltage divider which determines the feedback ratio of the oscillator and thus determines the amplitude of said oscillations, a second electron discharge device having an anode, first and second control electrodes, and a cathode, the anode and cathode of said second discharge device being respectively connected to the anode and cathode of said first discharge device, a third capacitor connected between the anode and first control electrode of said second discharge device and a resistor connected between the first control electrode and cathode of said second discharge device, whereby said second discharge device constitutes a reactance tube effectively connected in parallel with said first capacitor, the electric potential of said second control electrode controlling the reactance thereof, and thus controlling the feedback ratio of said feedback circuit and the amplitude of said oscillations.

12. An electrical oscillator comprising first and second electron discharge devices each having an anode, a control electrode, and a cathode, the anode and cathode of said second discharge device being effectively connected to the control electrode and cathode respectively of said first discharge device, an inductor and a resistor effectively connected in series between the anode and the control electrode of said first discharge device, and two capacitors connected in series across said inductor, the cathode of said first discharge device being effectively connected to the circuit junction between said two capacitors, thus forming a regenerative feedback circuit for producing electric oscillations in which said two capacitors, said resistor, and said second discharge device are comprised in a voltage divider which determines the feedback ratio of the oscillator and thus determines the amplitude of said oscillations, the control electrode electric potential of said second discharge device controlling the conduction of electric current thereby, and thus controlling the feedback ratio of said feedback circuit and the amplitude of said oscillations.

13. An electrical oscillator comprising an electron discharge device having an anode, a control electrode, and a cathode, and a regenerative feedback circuit connected to feed back to said control electrode a portion of the anode electric potential variations in regenerative phase relation, whereby electric oscillations are produced, said feedback circuit including other electron discharge means connected to control the feedback ratio, said other discharge means comprising a second anode and a second control electrode electron-coupled to said discharge device, the electric potential of said second control electrode controlling the conduction of current to said second anode and thus controlling the amplitude of said oscillations.

14. An electrical oscillator comprising an electron discharge device having a first anode, a first control electrode and a cathode, a parallel resonant circuit effectively connected between said first anode and said first control electrode, other electron discharge means comprising a second anode and a second control electrode electron-coupled to said discharge device, a first capacitor connected between said second anode and said cathode, and a second capacitor connected between said first control electrode and said cathode, thus forming a regenerative feedback circuit connected to feedback to said first control electrode a portion of the first anode electric potential variations in regenerative phase relation, whereby electric oscillations are produced, the feedback ratio of said feedback circuit being controlled by the electric potential of said second control electrode, which thus controls the amplitude of said oscillations.

15. A voltage regulator comprising an electrical oscillator having a regenerative feedback circuit for producing electric oscillations, electron discharge means connected in said feedback circuit for controlling the feedback ratio thereof, said discharge means having a control electrode the electric potential of which controls the conduction of electric current by said discharge means, and thus controls the feedback ratio of the oscillator and the amplitude of said oscillations, input and output electric terminals, a tapped voltage divider connected across said output terminals, circuit means connecting the tap of said voltage divider to the control electrode of said discharge means, whereby voltage fluctuations across said output terminals produce corresponding amplitude changes of said oscillations, an electric discharge device having an anode, a control electrode, and a cathode, said anode and cathode being connected in series between said input and output terminals, and rectifying means connected to provide a voltage between the control electrode and cathode of said discharge device related in value to the amplitude of said oscillations, whereby the conduction of current by said discharge device is controlled to regulate the voltage between said output terminals.

References Cited in the file of this patent

UNITED STATES PATENTS

| | | |
|---|---|---|
| 2,204,422 | Loughren et al. | June 11, 1940 |
| 2,302,876 | Malling | Nov. 24, 1942 |
| 2,424,905 | Scheldorf | July 29, 1947 |
| 2,489,327 | Royden | Nov. 29, 1949 |
| 2,512,658 | Levy | June 27, 1950 |
| 2,523,051 | Norgaard | Sept. 19, 1950 |
| 2,543,030 | King | Feb. 27, 1951 |

FOREIGN PATENTS

| | | |
|---|---|---|
| 425,308 | Great Britain | Mar. 7, 1935 |